United States Patent [19]

Morales-Garza et al.

[11] Patent Number: 4,591,906

[45] Date of Patent: May 27, 1986

[54] WIRELESS TRANSMISSION FROM THE TELEVISION SET TO THE TELEVISION STATION

[76] Inventors: Fernando Morales-Garza; Oscar Morales-Garza; Jorge E. Ortiz-Salinas, all of Ave.Junco de la Vega #208 Colonia Roma, 64700, Monterrey, N.L., Mexico

[21] Appl. No.: 739,083

[22] Filed: May 29, 1985

Related U.S. Application Data

[63] Continuation-in-part of Ser. No. 561,211, Dec. 13, 1983, abandoned.

[51] Int. Cl.⁴ .............................................. H04H 9/00
[52] U.S. Cl. ............................................ 358/84; 455/2
[58] Field of Search ................ 358/84, 147; 455/2, 455/4, 5; 370/96

[56] References Cited

U.S. PATENT DOCUMENTS

| | | | |
|---|---|---|---|
| 3,769,579 | 10/1973 | Harney | 358/84 |
| 3,803,349 | 4/1974 | Watanabe | 358/84 |
| 3,990,036 | 11/1976 | Savit | 370/96 X |
| 3,997,718 | 12/1976 | Ricketts et al. | 358/84 |
| 4,225,884 | 9/1980 | Block et al. | 358/84 X |
| 4,245,245 | 1/1981 | Matsumoto et al. | 358/84 X |
| 4,290,141 | 9/1981 | Anderson et al. | 455/2 |
| 4,347,604 | 8/1982 | Saito et al. | 358/84 X |
| 4,536,791 | 8/1985 | Campbell et al. | 358/147 X |

FOREIGN PATENT DOCUMENTS

| | | | |
|---|---|---|---|
| 58-17741 | 2/1983 | Japan | 358/84 |
| 1523753 | 9/1978 | United Kingdom | 358/84 |

*Primary Examiner*—Keith E. George
*Attorney, Agent, or Firm*—Laurence R. Brown

[57] ABSTRACT

Query signals are transmitted by wireless means from the television station to the television set. Response units at receiver locations have a radio frequency transmitter send a response to the station inquiry sent on horizontal lines of the T.V. signal at controlled times identifying each station. This response is a simple r-f beep synchronized with the T.V. signal, in such a way that each set transmitter emits the beep only in its unique time slot. Simplified response units are tuned to the standard intermediate frequency of the T.V. sets and thus need not be wired in and need not have a channel selector.

8 Claims, 18 Drawing Figures

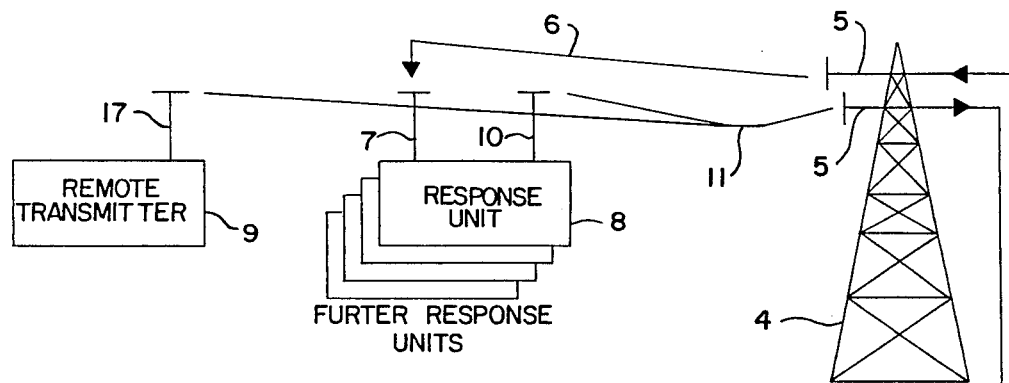
FIG. 1
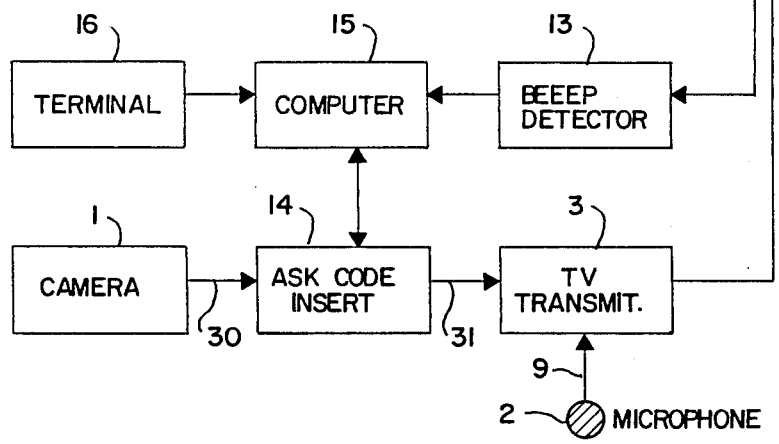
FIG. 2
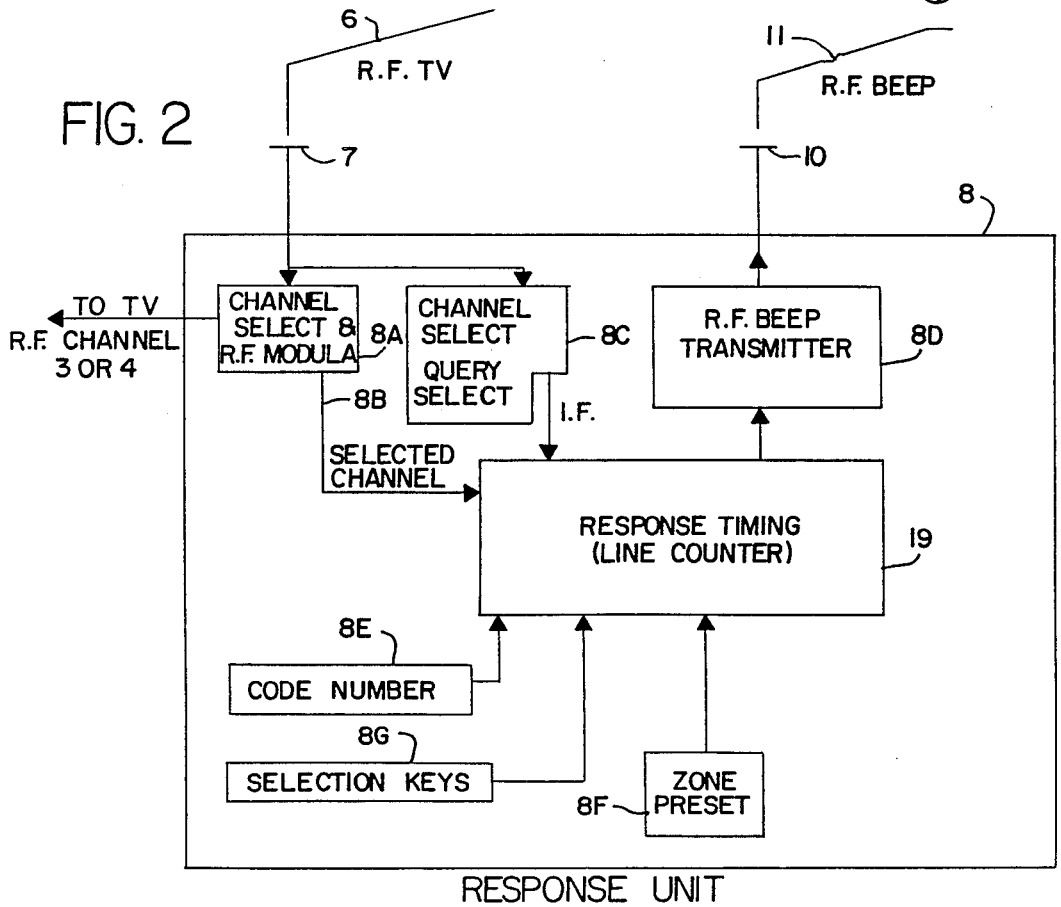

| | 24 | 23 | 22 | 21 | 20 | 19 | 18 | 17 | |
|---|---|---|---|---|---|---|---|---|---|
| | 128 | 64 | 32 | 16 | 8 | 4 | 2 | 1 | |
| 0- | | | | | | | | | — NOT VALID |
| 1- | | | | | | | | ▨ | — TRANSMIT GROUP 1 AND RECEIVE DELAY TIME (8,4,2,1) |
| 2- | | | | | | | ▨ | | — TRANSMIT GROUP 2 AND RECEIVE DELAY TIME (8,4,2,1) |
| 3- | | | | | | | ▨ | ▨ | — TRANSMIT GROUP 3 AND RECEIVE DELAY TIME (8,4,2,1) |
| 4- | | | | | | ▨ | | | — TRANSMIT GROUP 4 AND RECEIVE DELAY TIME (8,4,2,1) |
| 5- | | | | | | ▨ | | ▨ | — TRANSMIT GROUP 5 AND RECEIVE DELAY TIME (8,4,2,1) |
| 6- | | | | | | ▨ | ▨ | | — CLEAR STATUS |
| 7- | | | | | | ▨ | ▨ | ▨ | — CLEAR KEYS |
| 8- | | | | | ▨ | | | | — ON LATCH KEYS |
| 9- | | | | | ▨ | | | ▨ | — OFF LATCH KEYS |
| 10- | | | | | ▨ | | ▨ | | — TRANSMIT IF A |
| 11- | | | | | ▨ | | ▨ | ▨ | — TRANSMIT IF B |
| 12- | | | | | ▨ | ▨ | | | — TRANSMIT IF C |
| 13- | | | | | ▨ | ▨ | | ▨ | — TRANSMIT IF NOT A |
| 14- | | | | | ▨ | ▨ | ▨ | | — TRANSMIT IF NOT B |
| 15- | | | | | ▨ | ▨ | ▨ | ▨ | — TRANSMIT IF NOT C |
| 16- | | | | ▨ | | | | | — SAVE STATUS IF A |
| 17- | | | | ▨ | | | | ▨ | — SAVE STATUS IF B |
| 18- | | | | ▨ | | | ▨ | | — SAVE STATUS IF C |
| 19- | | | | ▨ | | | ▨ | ▨ | — TRANSMIT IF STATUS AND A |
| 20- | | | | ▨ | | ▨ | | | — TRANSMIT IF STATUS AND B |
| 21- | | | | ▨ | | ▨ | | ▨ | — TRANSMIT IF STATUS AND C |
| 22- | | | | ▨ | | ▨ | ▨ | | — TRANSMIT IF STATUS |
| 23- | | | | ▨ | | ▨ | ▨ | ▨ | — TRANSMIT IF NOT STATUS |
| 24- | | | | ▨ | ▨ | | | | — TRANSMIT |
| 25- | | | | ▨ | ▨ | | | ▨ | — ON WINNER LED SHOW IF STATUS ON |
| 26- | | | | ▨ | ▨ | | ▨ | | — OF WINNER LED SHOW |
| 27- | | | | ▨ | ▨ | | ▨ | ▨ | — TRANSMIT IF WINNER LED SHOW |
| 28- | | | | ▨ | ▨ | ▨ | | | — TRANSMIT IF NOT WINNER LED SHOW |
| 128 ↓ 255 | ▨ | 64 | 32 | 16 | 8 | 4 | 2 | 1 | — TV-CHANNEL NUMBER |

ALL GROUPS

FIG. 12

| 1 | 2 | 3 | 4 | 5 |
|---|---|---|---|---|
| 001 | 002 | 003 | 004 | 005 |
| 006 | 007 | 008 | 009 | 010 |
| 011 | 012 | 013 | 014 | 015 |
| 016 | 017 | 018 | 019 | 020 |
| 021 | 022 | 023 | 024 | 025 |
| 026 | 027 | 028 | 029 | 030 |
| 031 | 032 | 033 | 034 | 035 |
| 036 | 037 | 038 | 039 | 040 |
| 041 | 042 | 043 | 044 | 045 |
| 046 | 047 | 048 | 049 | 050 |
| 051 | 052 | 053 | 054 | 055 |
| 056 | 057 | 058 | 059 | 060 |
| 061 | 062 | 063 | 064 | 065 |
| 066 | 067 | 068 | 069 | 070 |
| 071 | 072 | 073 | 074 | 075 |
| 076 | 077 | 078 | 079 | 080 |
| ... | ... | ... | ... | ... |
| 426 | 427 | 428 | 429 | 430 |
| 431 | 432 | 433 | 434 | 435 |
| 436 | 437 | 438 | | |

WIRELESS TRANSMISSION FROM THE TELEVISION SET TO THE TELEVISION STATION

BACKGROUND OF THE INVENTION

This is a continuation-in-part of our copending application Ser. No. 561,211 filed Dec. 13, 1983 for ELECTRONIC DEVICE TO TRANSMIT SIGNALS BY WIRELESS MEANS FROM THE TELEVISION SET TO THE TELEVISION STATION, now abandoned.

The transmission of images from an emitting station to television sets is well known in the art. But, it has never been economically feasible for a person seated in front of a television set to have the option of wireless communication with the television station. Consequently, the principal objective of this invention is to establish an improved medium by which a signal can be sent from the receiving set to the television station.

As a consequence of this invention, it will be possible to establish at any given moment who and how many viewers observe the program, or to detect the response of the television viewer to a specific question that the television station may ask.

Representative prior art relating to the interrogation of T.V. receivers is U.S. Pat. No. 3,769,579- Oct. 30, 1973 to R. Harney for Cable Television Monitoring System, which codifies a question on the T.V. signal for response from the receiving station. However, this system is limited to a small group of receivers each of which must respond in a different freqeuncy. Also, signals are sent out frame by frame and replies are limited in time to vertical blanking pulse periods. This seriously limits the numbers of receiving stations that can be polled in reasonably short time periods.

Another such system in U.S. Pat. No. 4,290,141 - Sept. 15, 1981 to R. E. Anderson et al. for Electronic Voting System, which does not transmit questions from the T.V. transmitter station. The transmission is in the form of digitally coded signals modulated on a carrier wave, thus requiring a broad band transmission system at high power and with complex transmitters and receivers.

A further system in U.S. Pat. No. 4,347,604 - Aug. 31, 1982 to M. Saito et al. for Bi-Directional Data Communications System, is also limited in numbers of receivers polled because of the time delays in communication over long distances and does not transmit queries over the T.V. signals. Also a separate transmission from the T.V. signals is required for both queries and answers. A modulated carrier is required for this as in Anderson above.

In British No. 1,523,753 published Sept. 6, 1978 for Two-Way Data Transmission System for Cable Television Network, each subscriber is given a different "answer delay" in response to a query signal transmitted to all subscribers so that the subscribers can be identified in a time multiplexing system. This system compensates for propagation time by a separate time delay counter. A digital communication system is required external to the television signal requiring modulation of a carrier.

None of these systems are feasible for r-f transmission of information by single unmodulated beeps of a selected carrier frequency synchronously during T.V. signal reception.

DISCLOSURE OF THE INVENTION

Given the number of television sets in existence, the simplest form of implementation would be to produce the response device as an accessory for the existing televisions and later to include the device inside the television set.

The electronic device which permits signals to be sent from the television set to the television station is a transmitter of a radio frequency which will or will not emit an r-f beep in response to a transmitted inquiry to indicate whether the response is affirmative or not. A keyset panel will permit viewer selected answers.

This beep responds to a question located in the T.V. signal in the horizontal lines.

In order to prevent all of the devices from beeping simultaneously, a different identification number will be assigned to each response device produced, and a counting circuit is placed in each device which only permits beeping at a unique horizontal line location in response to a question. This means that the answers will be ordered according to the number of devices. The duration of the response beeps is less than the time for one horizontal line. Thus, if each response device is assigned a line location, the T.V. signal is sent on 15750 horizontal lines per second, 15750 answers can be received per second, almost a million each minute.

Example of questions which can be asked:
Is the television set on?
Did the television viewer push button A?
Reset the keys of the devices.

It is logical to think that if the devices are found at distinct distances from the transmitter, the signals will take longer for some devices than for others. In order to solve this, a circuit (depending on the place of location and distance), may be incorporated into the device to select the moment at which it must transmit. This is simple, since the beeps have a shorter duration than the intervals of the horizontal line. Thus, zones of different kilometers in radius from the television station can be identified for different transmission times to zone coding for timing response beeps.

On horizontal lines sent to the television viewers a series of signals will be sent in timed order identifiable by counting the horizontal sync pulses of the T.V. signal thus identifying each response device at a particular time so that an identifiable response unit will be obtained. Because of the single r-f beep response signal only a simple transmitter will be needed to emit a signal from every response device on the same frequency.

These time multiplexed digital beeps (0/1) are received at the transmitter and counted or processed by a computer, which will process the information together with the horizontal synchronization information to permit identification of specific response device answers.

The object of the invention is to provide bidirectional communication between a television station and its viewers, in which:

All information (sound, video, data and sync) from the T.V. station to the viewers is carried within the standard frequency spectrum allowed for T.V. transmission.

All viewers within a typical metropolitan area can communicate with the T.V. station (up to 788,400 viewers per minute in a 22.5 mile radius from the T.V. power transmitter) in a fast and reliable form.

All information from the T.V. viewers to the T.V. station is carried on a single radio frequency of low bandwidth, using a time division multiplexing format.

The viewers T.V. answer terminal is linked to the T.V. station signal through the electromagnetic irradiation of the intermediate frequency (i-f) coming from signal amplifiers of the T.V. set. Simplifying terminal construction and improving operation as:

The i-f signal is stronger than its r-f counterpart at close distances from the T.V. set.

The terminal has no need for a channel selector and will always be tuned to the same channel as the T.V. set, the terminal will work with any number of T.V. stations.

There is no need for interconnecting the terminal to the T.V. antenna or to the T.V. set (no installation).

The terminal will work with any T.V. in the house without need for re-connection.

Each member of the family can have its own terminal (without the need for complex wiring).

The terminal can be portable.

The system should work with T.V. signals carried over the air and with T.V. signals carried through cable simultaneously.

The use of a single frequency for all communication of viewers to the T.V. station makes it easier to obtain authorization and a higher radiated power permit. The use of short time pulses makes it easier to construct an inexpensive high power transmitter, as power dissipation is not an issue in the short time that the transmitter operates.

BRIEF DESCRIPTION OF THE DRAWINGS

The details of the invention are clearly shown in the following description and in the accompanying drawings, where similar reference symbols serve to show related parts in the different figures.

FIG. 1 shows a general block schematic diagram of the system afforded by this invention;

FIG. 2 shows a block diagram of the response unit;

FIG. 12 is a data bit organization chart;

DETAILED DESCRIPTION OF THE INVENTION

Figure 3:
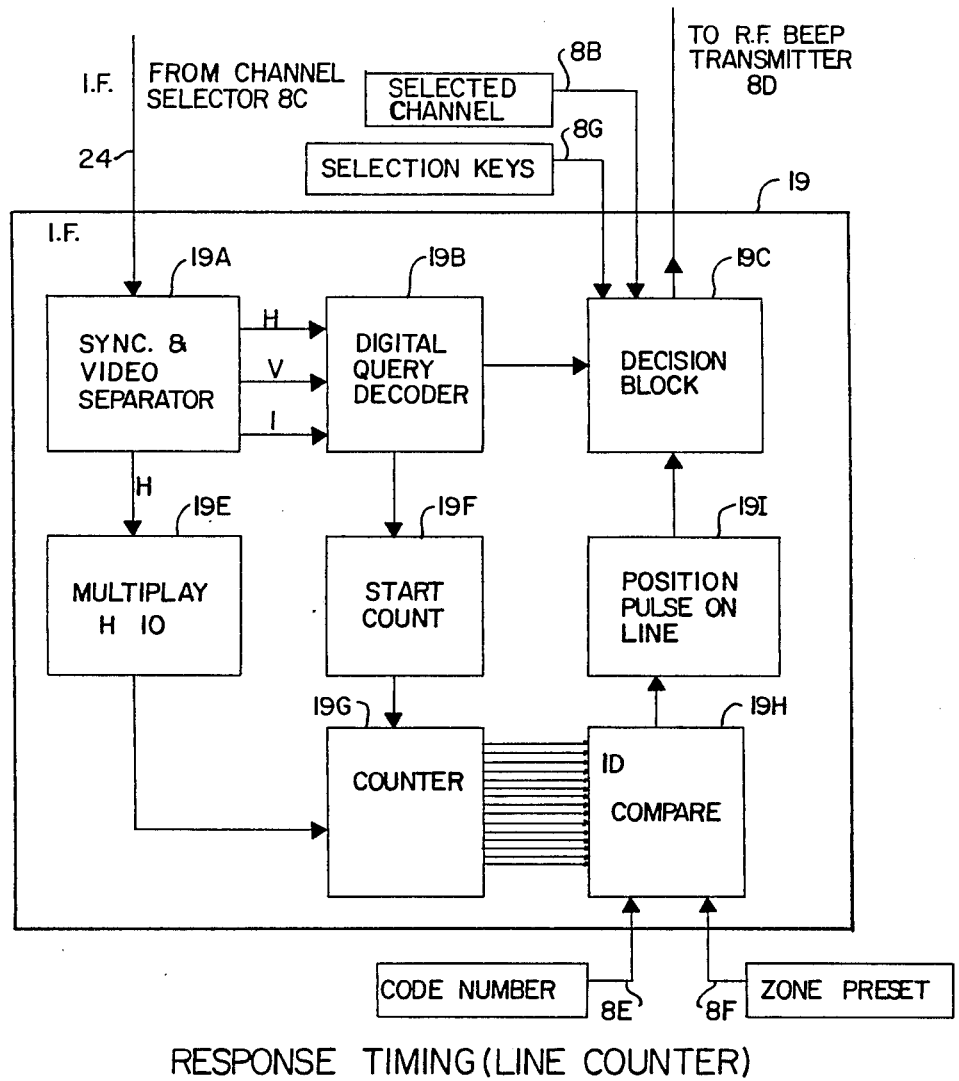
FIG. 3 shows a diagram of the response timing circuit for determining when the answer should be transmitted.

In reference to the block diagram representation in the drawings, the state of the electronic arts necessary to implement the system is already well known in the areas of television, radio communication and computation employed.

The video signal originates from a television camera 1 or equivalent signal source. The audio signal originates in a microphone 2 as a symbol of any equivalent generator of audible signals. These signals are fed to a T.V. transmitter 3. A tower 4 supports sending and receiving antennas 5. The sending antenna emits the television signal 6 through the air for capture by an antenna 7 receiving T.V. signals 6 linking the response unit 8 for communications between the television viewers and the television station.

Figure 4:
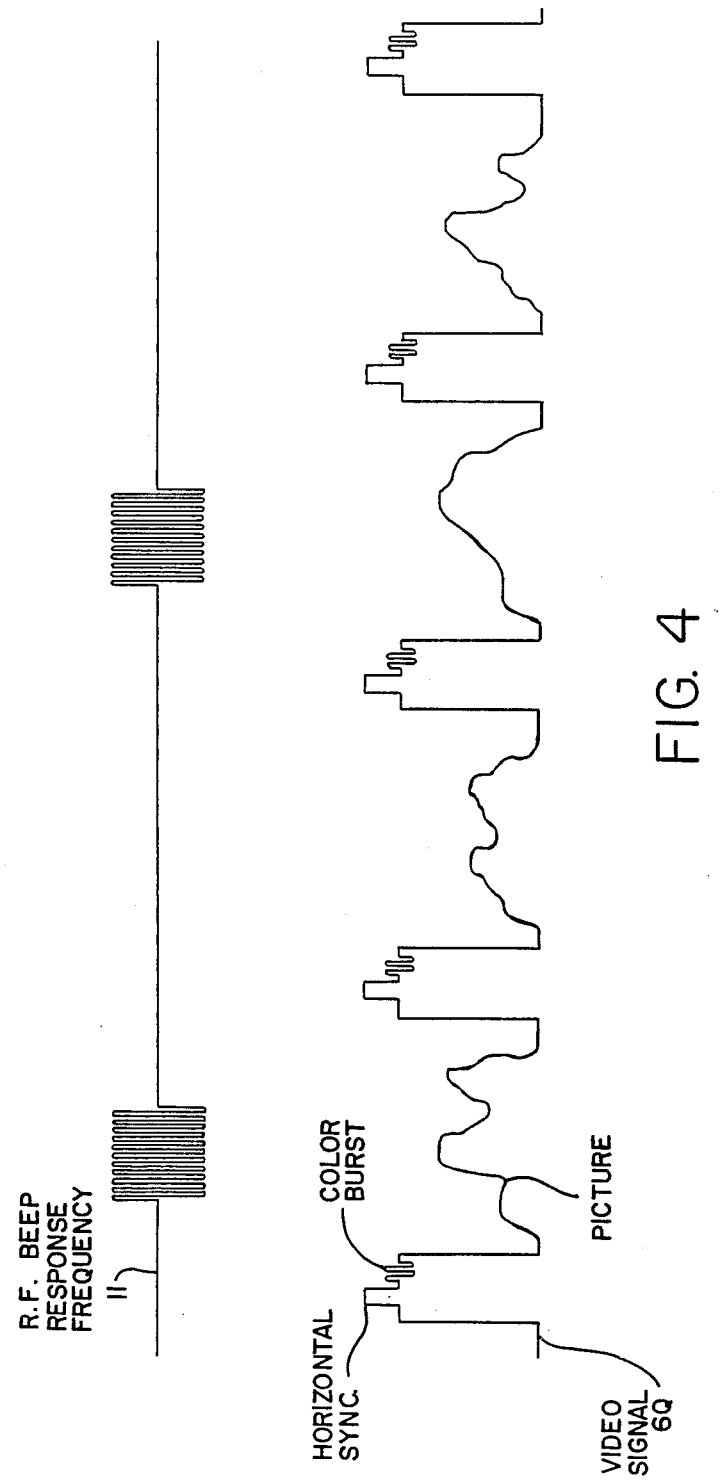
FIG. 4 shows a typical diagram of the image query signal and the answer signal.

Using an antenna 10 an answer is transmitted from the response device 8 to the station via air waves, using beep signals 11 in FIG. 4. These beeps will be captured by receiving antenna 5 and response signal detector 13 tuned to the single beep frequency assigned for all of the television viewers of a particular location. This detector 13 determines the pulse timing and thus identifies each response unit 8, from the sync pulses of the television signal.

Figure 6:
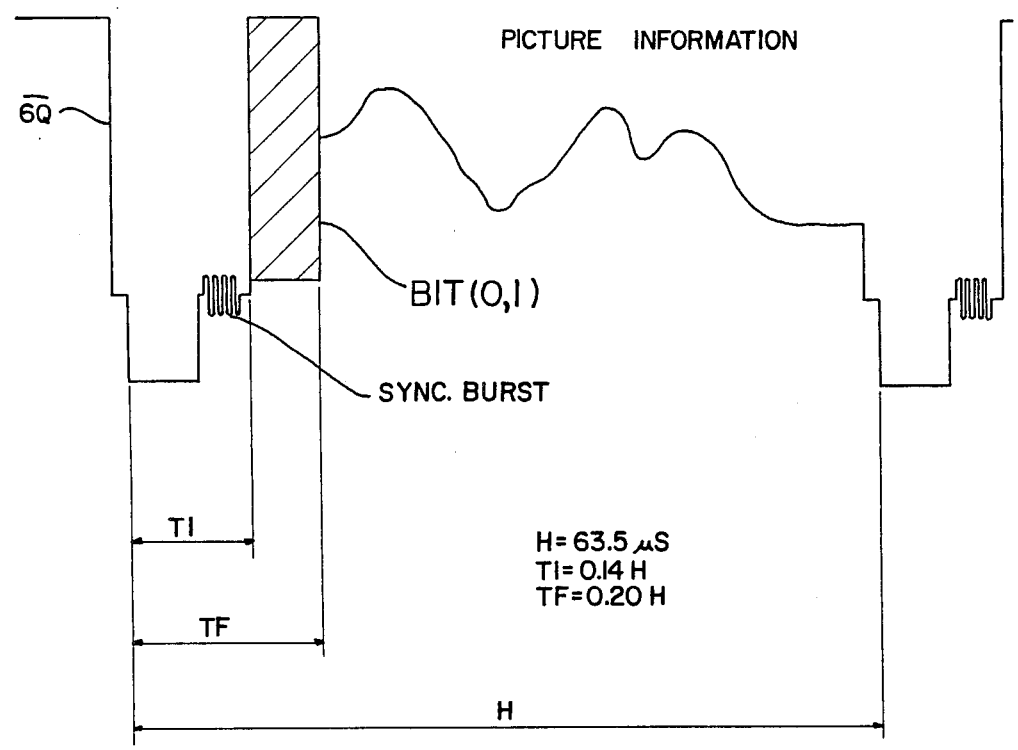
FIG. 6 is a waveform sketch of a video signal encoded for operation in this system.
Figure 7:
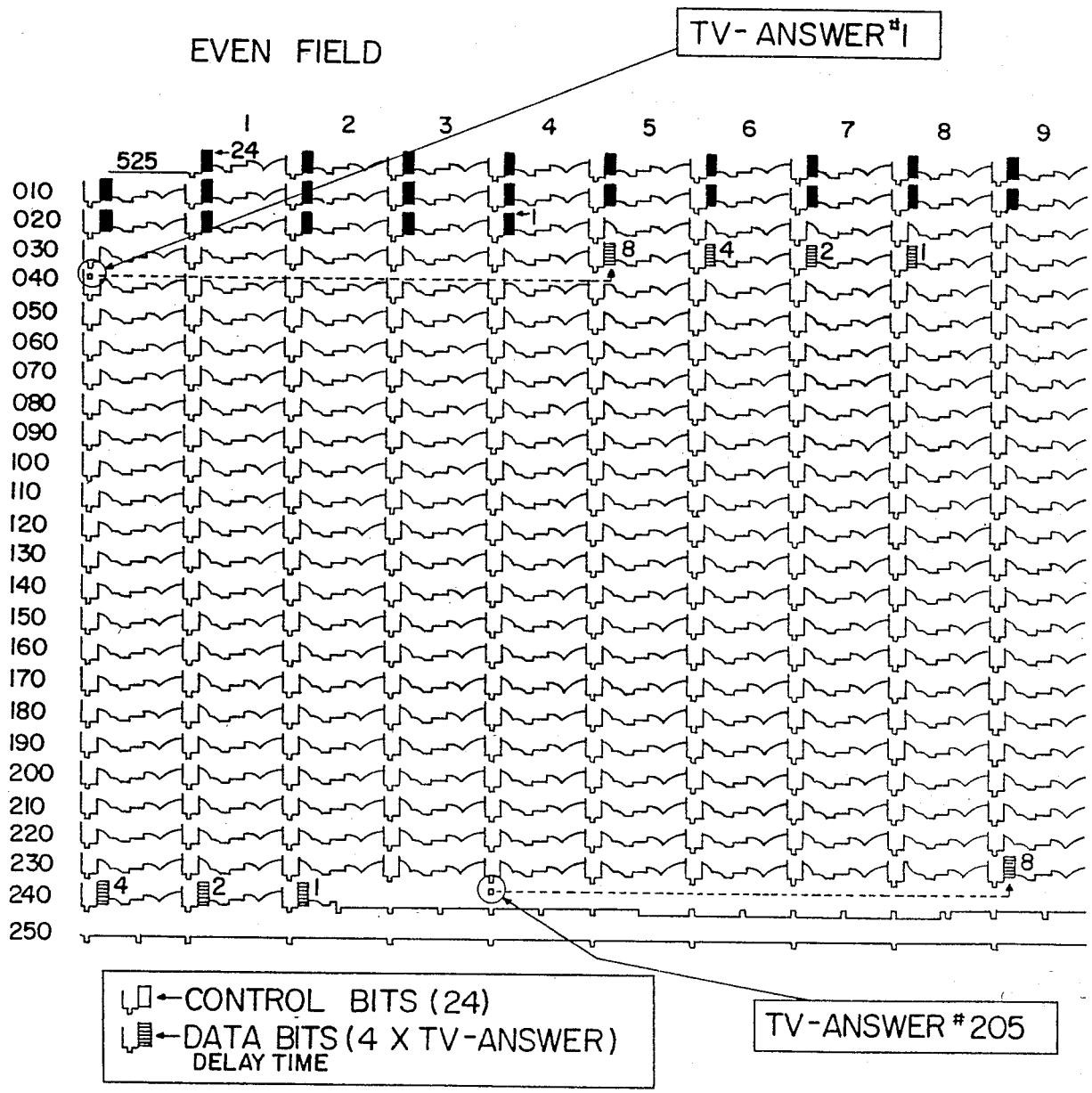
FIGS. 7 and 8 show even and odd fields of a T.V. signal showing organization of the answer and query signals.
Figure 8:
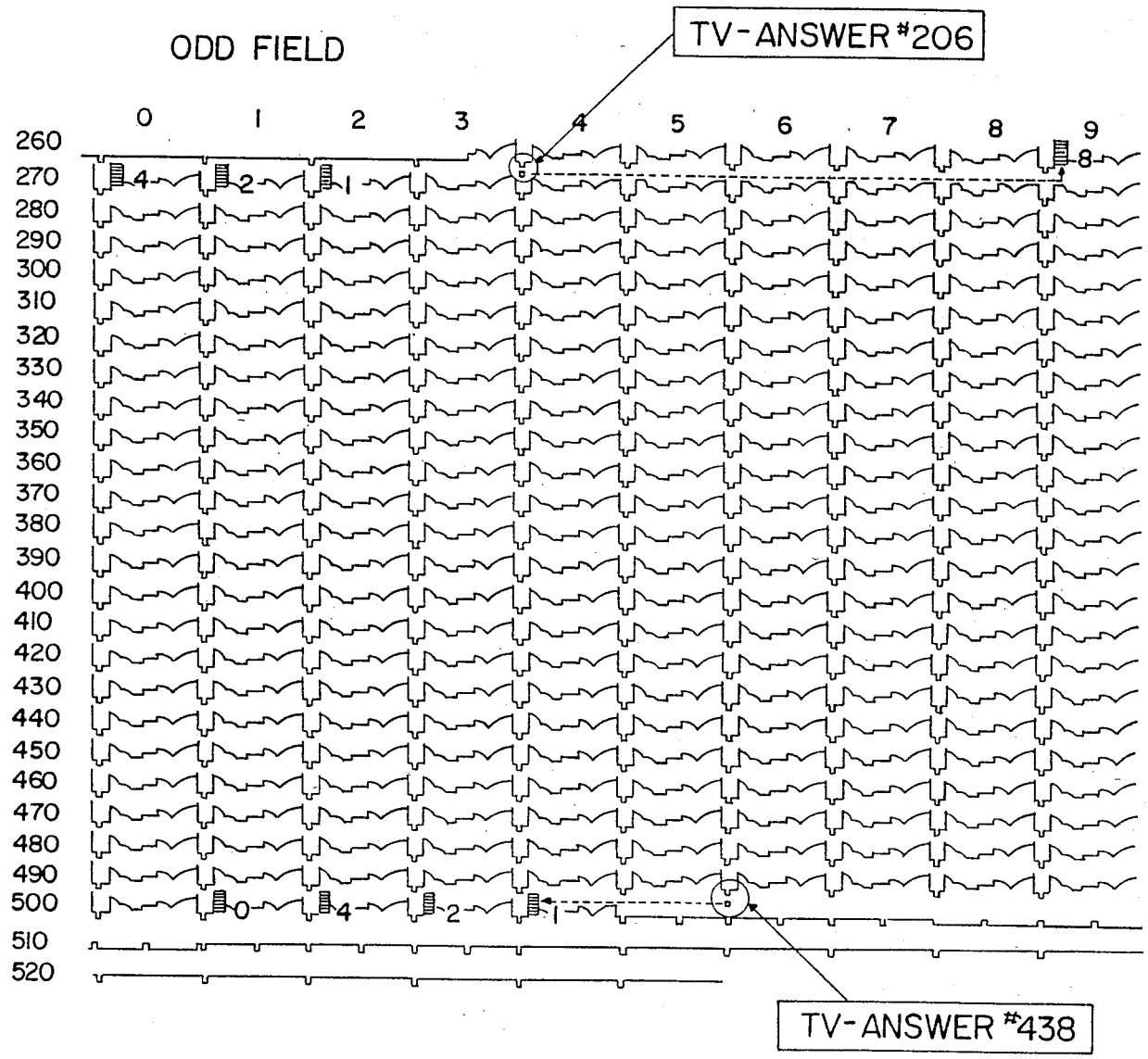

In order to generate the questions for the response device to answer, means 14 for inserting the questions into the T.V. signal is capable of inserting a digital code containing the question, as a sequency of single digital bits inserted on each horizontal line (as seen in FIGS. 6, 7 and 8).

The computer 15 will process the answers received by the beep detector 13 obtaining the results desired to the extent it has the necessary resources for doing this. For example, in order to determine how many television sets are turned on, it only needs to add up the responses over a specified number of frames. If the question was: Tell me the names, addresses and telephone numbers of the television viewers which answered affirmatively to the question asked by the announcer, this would require the computer to have information provided by additional means including a response unit owner address data bank.

The program of this computer will process response beep signals received at a speed up to 15750 per second. Simultaneously the computer is counting the horizontal synchronism, in such a way that the horizontal line count corresponds to different responses, received during a time period just after generating the question. Thus, the first response corresponds to the response code identification of a first television viewer, the second, to the response code identification of the second television viewer, and thus successively. The maximum number of television viewers in the system will be fixed by the number of horizontal lines occurring between questions, as determined by the computer program and the number of response devices in the system. For example, if five million television viewers are wanted, and response devices are scheduled for that number of television viewers, the questioning period extends over intervals of five and a half minutes during which horizontal lines are counted.

By way of a computer terminal 16 the questions can be asked to the computer and the answer can be obtained from the resulting responses.

To eliminate noise interference a remote transmitter 17 will be utilized. It will operate on the beep frequency assigned for the television viewers of a particular station. This r-f signal is transmitted using antenna 17 and it is a continuous r-f signal with a low amplitude and it serves to eliminate noise interference in the detector 13 by feeding a continuous signal to the automatic fine tuning (aft) circuits of the beep detector 13.

The response units 8 permit the television viewers to communicate with the television station. These units (as shown in FIG. 2) have a channel selector 8A to select channels which the television viewer wishes to see. The channel number selected 8B by the television viewer is fed by a set of wires to the response unit in this embodiment.

The question channel is tuned by channel selector 8C.

The responses will be emitted by the r-f beep transmitter 8D (11, FIG. 4), which transmits an r-f carrier pulse with fixed amplitude. This circuit will only transmit when the response circuit 19 indicates a query has been made and the answer should be a beep. Since this circuit will transmit a pulse of only 30 microseconds high power can be achieved with low cost circuits, also taking advantage of the narrow bandwidth of an unmodulated carrier wave.

The response timing circuit 19 to determine when to transmit is a fundamental part of the invention. This circuit contains a counter and synchronizing circuit in order to determine on what horizontal line the beep is transmitted.

In order to determine when to transmit, a device code number is required such as a counter having a preset count that makes the circuit 19 respond to a binary count representing a number from 256 to 8.3 million, which will be the identification number of that response device. That circuit will be preset in the factory and will not ever be modified. Also, a further timing factor affecting the moment of the transmission is the number of the distance zone 8F. With this number the counter can be set ahead to compensate for travel time of the signal through the air to the television station from "far away response" units. This number can be built as counter preset switches so that the installer can place them according to the location zone in which the response device is found.

In order to make possible a decision from the television viewer to also be transmitted by the device, one or more keys 8G feed the decision of the television viewer at a given moment. They could initially be of two kinds: one so that the television viewer can send his decision of "I like it", "good", "I accept", "affirmative". And the other to send the decision of: "I don't like it", "bad", "I refuse", "negative". In order for the television viewer to push a momentary button a storage circuit can be incorporated to store his decision until the television station resets. If the number of keys were increased, more data could be transmitted.

The response timing 19 of FIGS. 2 and 3 receives the codified T.V. signal of FIGS. 6, 7, 8 from receiver 8C. The sync generator 19A produces horizontal (H), vertical (V) synchronization signals and video image (I) signal. These signals (H, V, I) are fed to a query decoded 19B that decodes a digital code number which represents the question sent out by the television computer 15. This digital code number can be from 0 to 255 and it will be sent as bits of digital data codified on horizontal lines as shown on FIGS. 6, 7 and 8.

In order to guarantee that a response is positioned on the horizontal line, a generator of pulses 19E generates impulses with a period equal to a tenth of the horizontal line and synchronizes these impulses with the horizontal synchronization pulses (H) in the circuit 19E. A counter circuit 19G starts counting in response to start circuit 19F after receiving the question 19B and stops the counting when the count for the particular response device which needs to be queried is reached.

At a point in time, the number in the counter 19G will be equal to the comparison number of the circuit 19H. This comparison number is composed by the code number 8E minus the zone preset 8F. When both numbers are identical the circuit 19I is activated. This circuit will limit the pulse duration to 30 microseconds.

Decision block 19C will activate r-f beep transmiter 8D if and only if conditions to motivate an answer to query on query decoder 19B are met.

A digital to analog converter 19D is used to modulate the power of the r-f beep according to the distance zone 8F.

Figure 5:
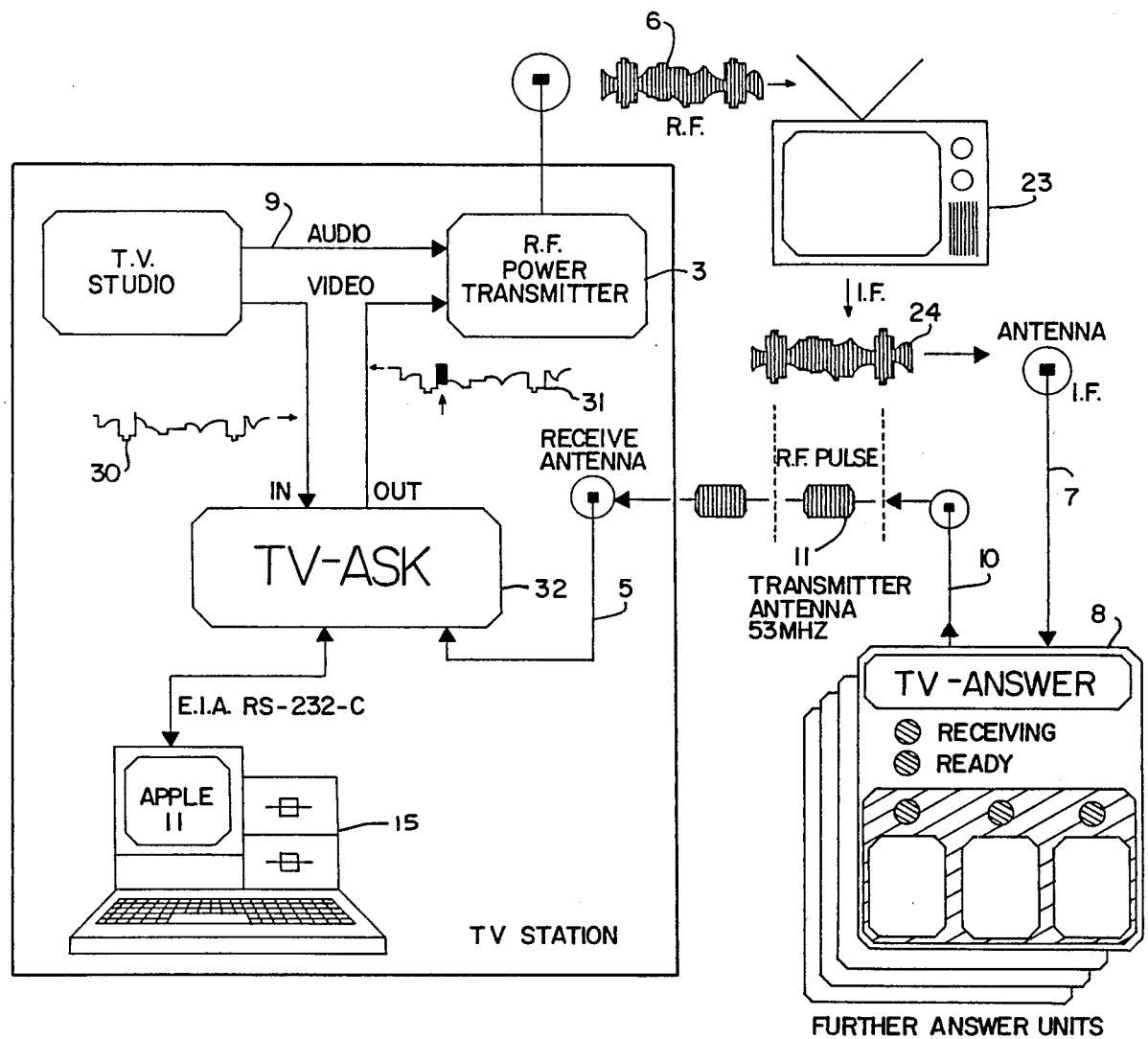
FIG. 5 is a diagrammatic system view with related signals.

Reference to FIG. 5 will show that the system of FIGS. 1 to 4 is modified by having a response unit 8' tuned to the i-f frequency 24 of the local T.V. set 23 and receiving the signal on its local antenna by being located adjacent the T.V. set. Thus, no wiring connection or installation is required, nor any tuner.

The T.V. station sends a modified radio frequency T.V. signal 6 that is received by plural T.V. sets 23. Each T.V. set 23 pre-amplifies the signal and heterodynes it with the output of a local variable oscillator converting it to a standard intermediate frequency (i-f) of 45.75 MHZ (an EIA standard since 1950). The i-f signal is then amplified by power i-f amplifiers, which radiate an i-f signal 24 received by any one or more T.V. answer terminals 8' which are close to the T.V. set 23. Each T.V. answer terminal 8' sends radio frequency pulses (r-f pulses) 11 back to the T.V. station.

At the T.V. station audio and video signals are generated. The video signal 30 is modified by the T.V. ask system 32 by encoding control and data bits according to instructions given to T.V. ask 32 by a personal computer 15 in the manner aforesaid. The encoding format is explained by FIGS. 6 to 8. Thus, each data and control bit is encoded on a deisgnated line as shown in FIG. 6, which shows preferred placement at the beginning of the line which usually is on an area to the left of the viewed video signal which is usually offscreen.

Figure 9:
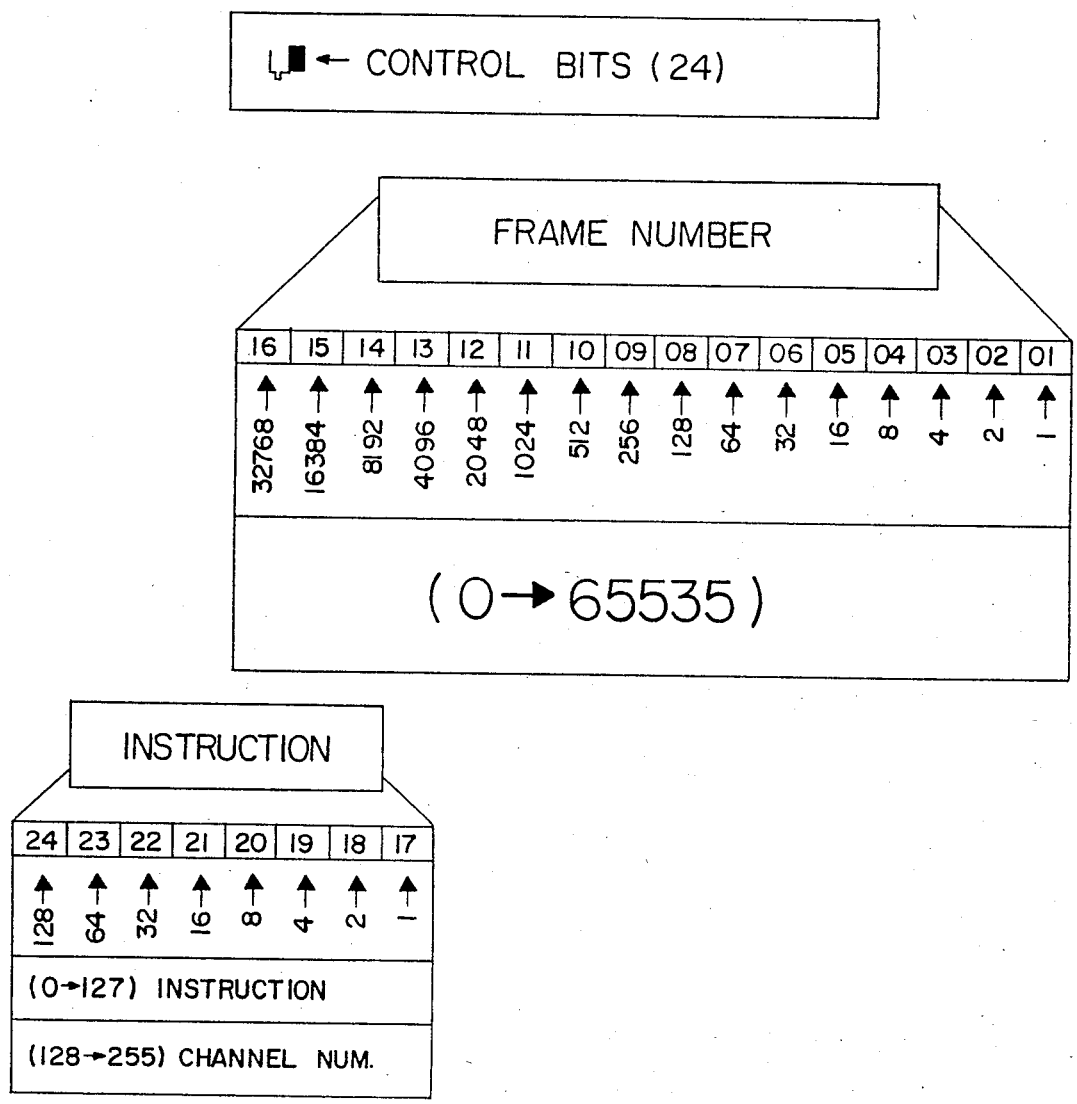
FIG. 9 is a diagrammatic view of the organization of the 24 control bits.

These bits are inserted into even and odd fields of a frame of 525 lines as shown in FIGS. 7 and 8. Thus, the first 24 lines include the 24 bit ask code. The first answer code of four bits is then at lines 35 to 38, the 205th answer code is at lines 239–242, the 438th answer code is at lines 501–504, etc. The overall arrangement of the 24 control bits for this embodiment is shown in FIG. 9.

The modified video signal 31 is amplitude modulated, and the audio signal 9 is frequency modulated by the T.V. power transmitter 3, which also limits radiated power and bandwidth to authorized standards, generating the modified radio frequency T.V. signal 6.

Figure 10:
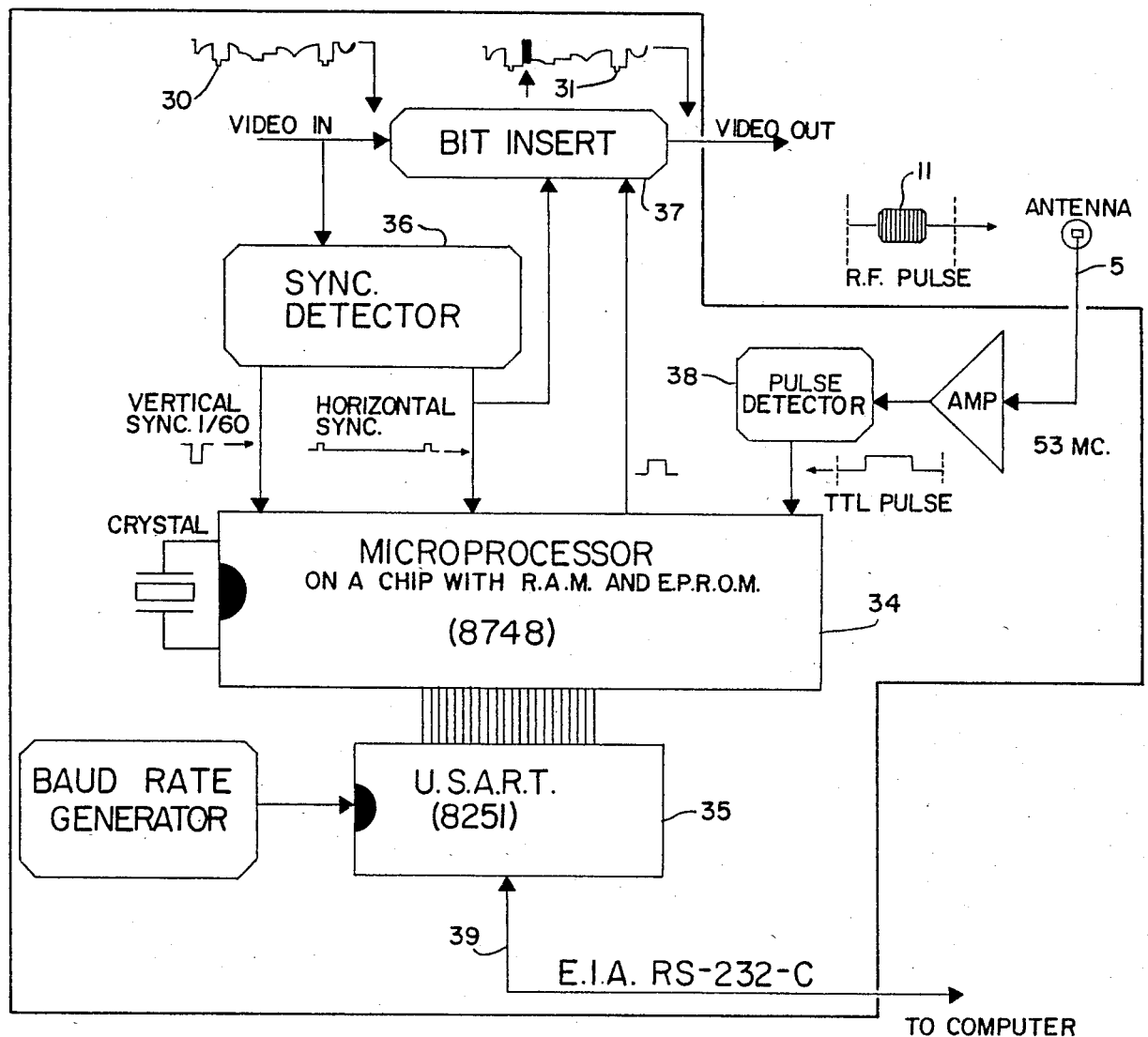
FIG. 10 is a diagrammatic view with signal sketches of the ask system.

FIG. 10 is a block diagram of the operating principles of the T.V. ask system. The T.V. ask system operates around a single chip microprocessor 34, typically widely available chip 8748, which contains random access memory (RAM) and eraseable programmable read only memory (EPROM) for program storage. The microprocessor 34 receives encoding orders from a computer, via a standard serial communication line 39

(EIA RS-23-C). A standard Universal Synchronous-Asynchronous Receiver Transmitter unit (USART) 35 converts serial encoding orders and communicates them to the microprocessor 34 in parallel format, the microprocessor 34 receives the vertical and horizontal sync information contained in the incoming video signal 30, from the sync detection circuit 36. With sync information and the encoding orders the microprocessor 34 activates the bit insert circuit 37 which encodes data and control information on the video signal 30 generating the modified video 31. The microprocessor 34 also receives the received r-f pulses 11, generated by plural T.V. answer terminals, through a pulse detection circuit 38. The microprocessor 34 sends this data to the computer, to determine how many or which T.V. answer terminals answered with the r-f pulses 11.

Figure 11:
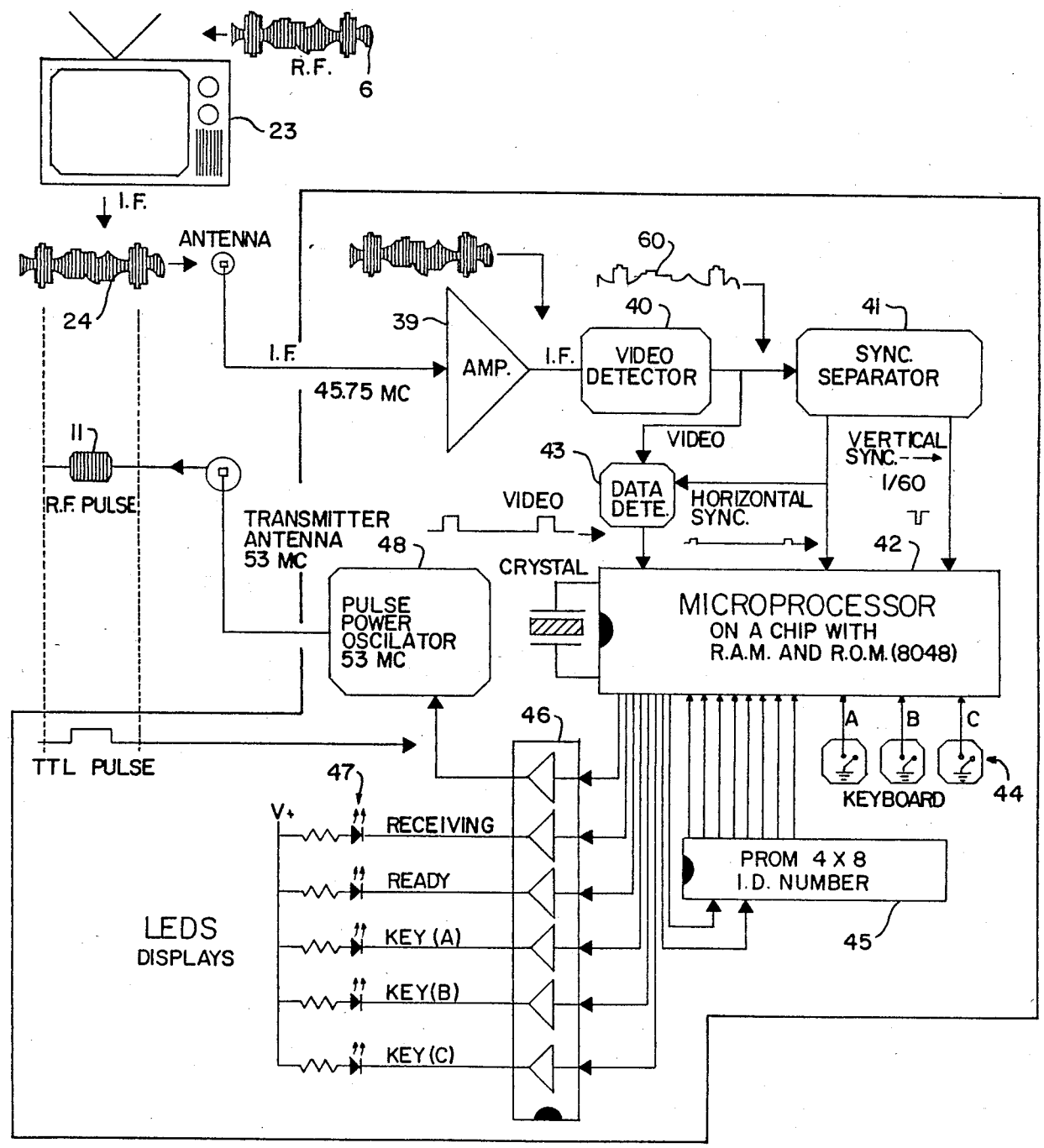
FIG. 11 is a diagrammatic view with signal sketches of the answer system.

FIG. 11 is a block diagram illustrating the principles of operation of a T.V. answer terminal 8'. The T.V. answer terminal receives the i-f signal 24 radiated by the T.V. set 23. This signal passes through an i-f amplifier 39, and a video detector circuit 40, and further passes through a sync detector circuit 41, generating vertical and horizontal sync pulses which are fed to microprocessor 42. The video signal passes also through a data detection circuit 43 which detects a high/low level in the video signal and feeds the information to microprocessor 42. As all data and control information is encoded immediately after a horizontal sync pulse (FIG. 6), the microprocessor 42 is able to read all control and data bits encoded on the T.V. signal. With information read from keyboard 44, PROM 45 (containing the unit ID number), data detector 43 and sync detector 41, the microprocessor 42 activates LED's 47 and pulse power oscillator 48 using driver 46 to transmit the response pulse 11.

Figure 13:
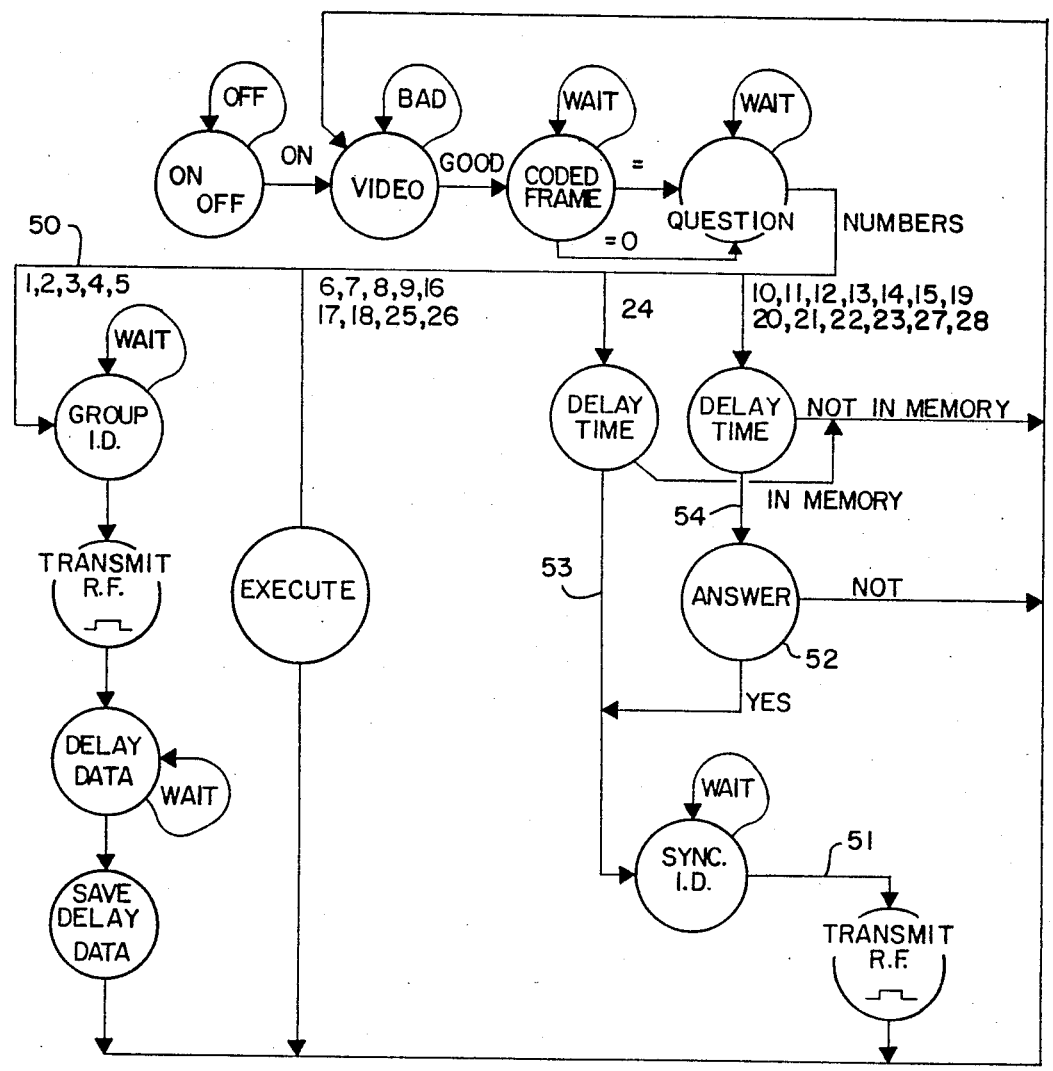
FIG. 13 is a system flow diagram for processing answer signals.

The microprocessor operation is described in FIGS. 12 and 13. In FIG. 12, a typical alignment of 28 control instructions is charted. With 24 bits in the transmitted code word, sixteen bits (1-16) are used for identifying the frame member (0-64,535). The remaining eight bits (17-24) are charted with bits 17-21 presenting 28 instruction choices. As may be seen, instructions 1 to 5 relate to groups, hereinafter discussed. Instructions 6 to 9 can control keys in the answer unit. Instructions 10-15, 19 to 23 and 27, 28 all give orders to transmit a beep under various conditions. Instructions 16 to 18 ask for storage of the status if keys A, B or C are actuated.

Controls in the answer system operate in the manner of flow chart 13. Thus starting with detection of set off or on conditions, the video signal need be good for processing, then the frame and question is passed onto bus 50. On receipt of instructions 6, 7, etc. the control function is executed in the answer system, such as by turning on or off the latch keys, etc.

When instructions 1 to 5 are present, answer terminals of that particular group transmit a r-f pulse that is used to measure the total delay time by the travel time it takes the signal from the T.V. station to the answer terminal and the response pulse from the answer terminal to the T.V. station. This delay data is encoded on the T.V. signal and received and saved by the answer terminal.

Figures 14, 18:
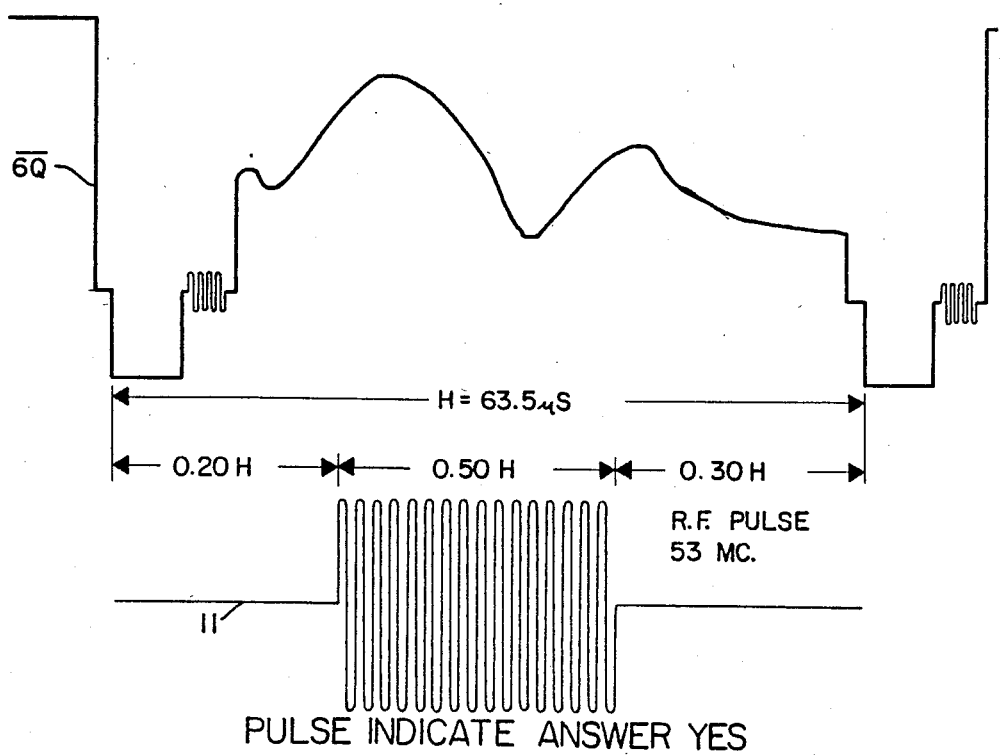
FIG. 14 is a waveform sketch of a video signal related with an answer pulse.
FIG. 18 shows groups of response units.

With orders to transmit a beep (10, 11, etc.) signals are processed via line 51 at appropriate timing if an answer is keyed (52). Instruction 24 is used to show the answer unit is working, for example, asking a response at appropriate ID time on bus 53. The answering beep is timed to come in the center of the timed video line identifying the answer unit as shown by FIG. 14.

Figure 15:
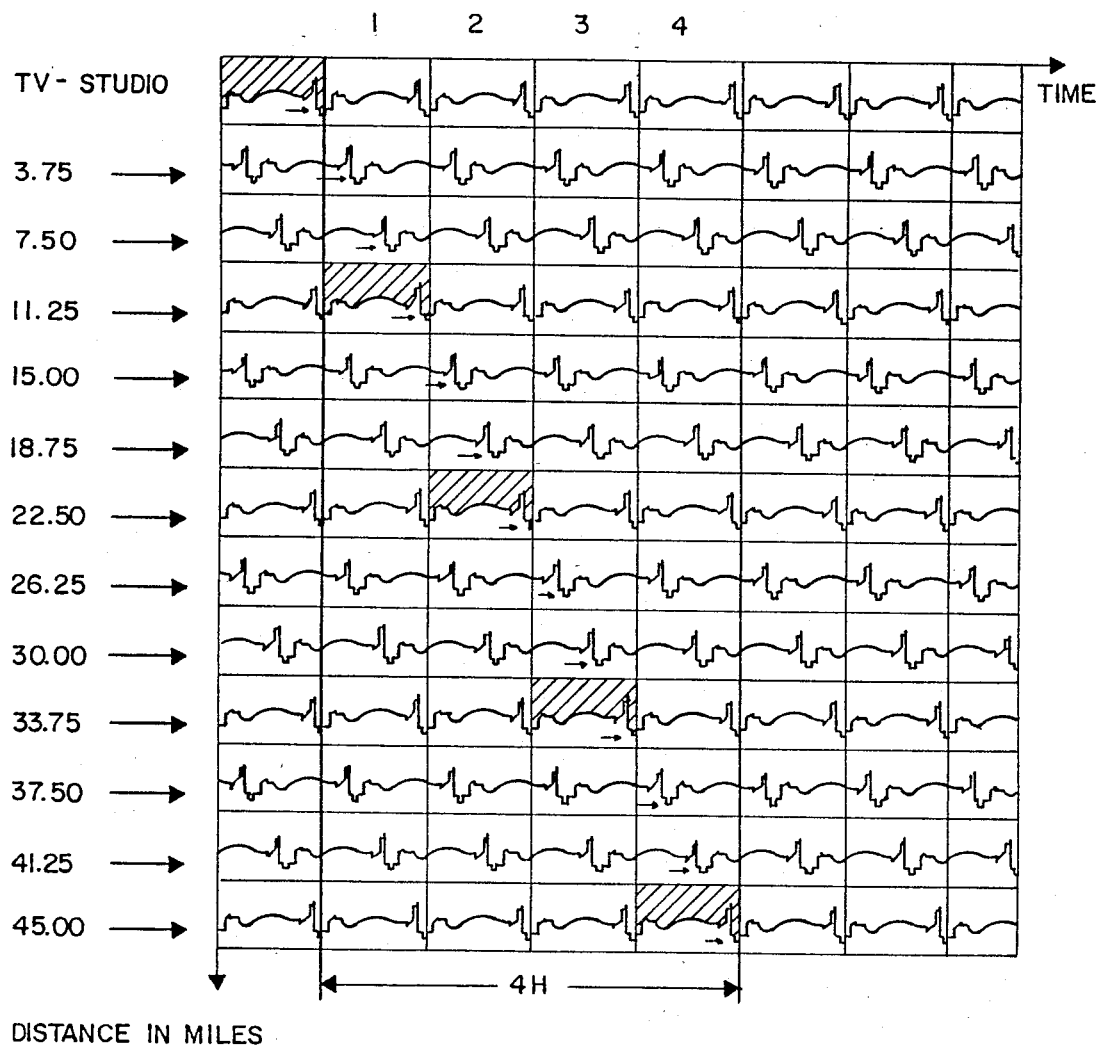
FIGS. 15 to 17 are charts explaining transit delay line behavior of this system.
Figure 16:
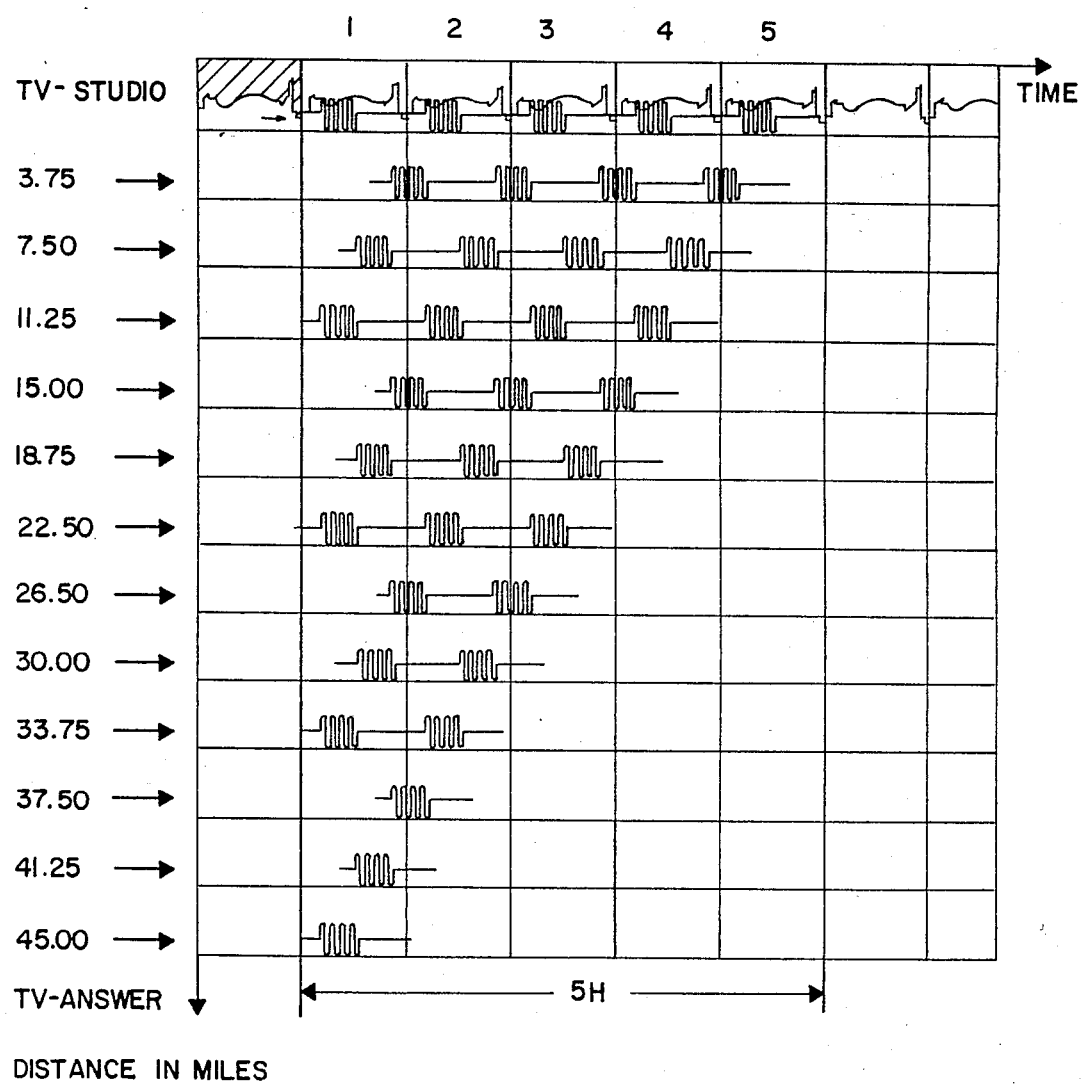
Figure 17:
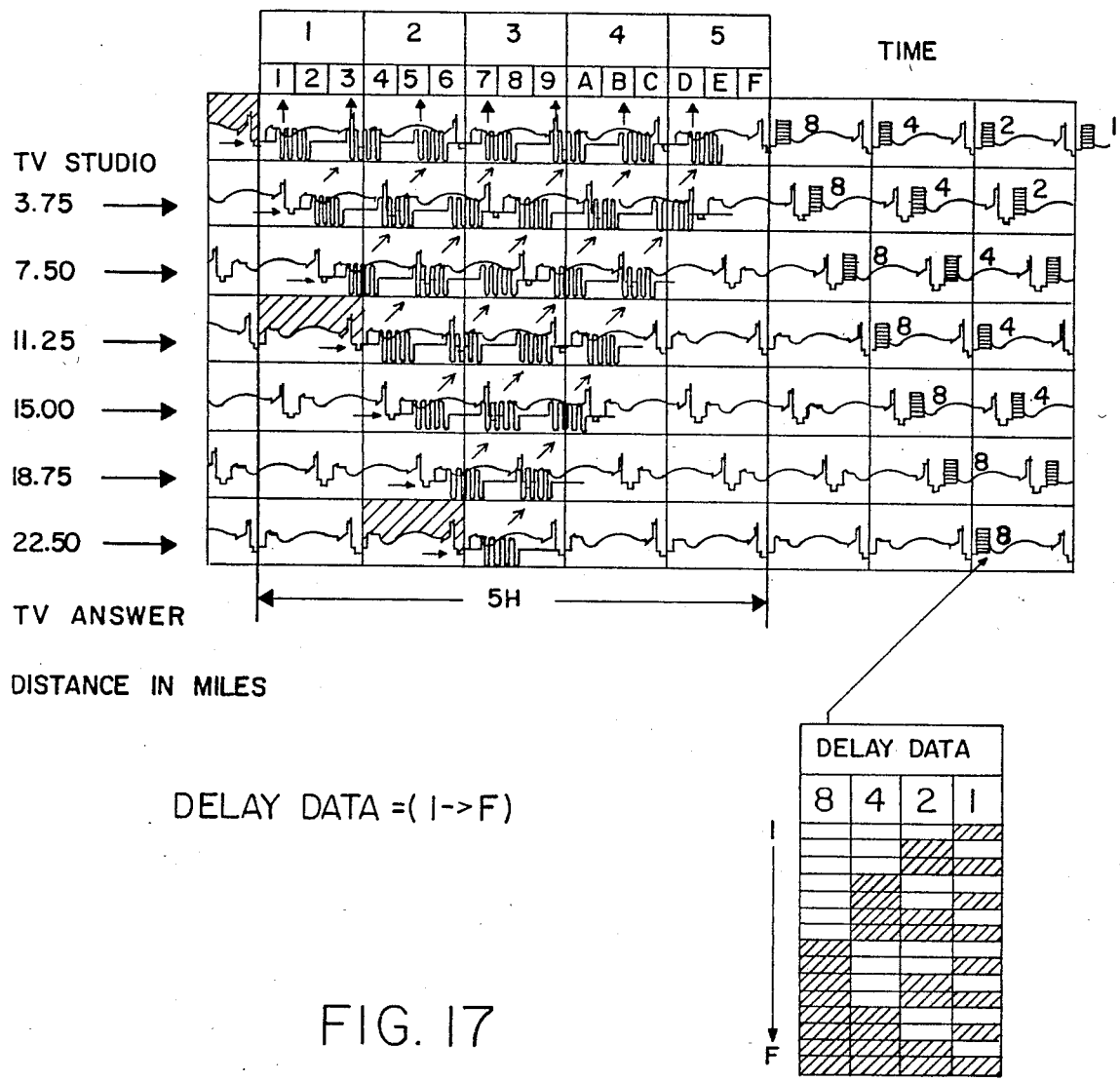

As there is a time delay for the T.V. signals to travel from the T.V. transmitter location to the T.V. receiver as described in FIG. 15, and there is also a time delay for the r-f pulse to travel from T.V. receiver back to the T.V. station as described on FIG. 16, a total processable delay time described on FIG. 17 is for a maximum distance of 22.5 miles from T.V. station in this described embodiment. Thus, to compensate for this delay, T.V. answer terminal should send its r-f pulse up to 5 sync pulses before its assigned response line. To do this each T.V. answer terminal must know the distance that separates it from the T.V. station. This is achieved by dividing all T.V. answer terminals in five distance groups (see legend 1, 2, 3, 4, 5 in FIG. 17). Thus, the T.V. ask system will order all T.V. answer terminals in groups to send r-f pulses by consecutively encoding instructions 1 to 5 of FIG. 12 on the eight most significant bits of the twenty-four control bits sent on each frame. By computing the total delay time that it takes to receive an answer from each terminal, the T.V. ask system will encode a four bit delay data (described in FIG. 17), after the fifth, sixth, seventh, and eighth horizontal sync pulses that follow the T.V. answer's assigned response time. (As described on FIGS. 7 and 8.) For example, the terminal 1 will send a r-f pulse after receiving instruction 1 (FIG. 12) and frame 1 encoded on lines 1 to 24 (FIG. 7), and receiving sync pulse 30.

The r-f pulse will be received by the T.V. ask system at any time (1 to F of FIG. 17) between sync pulse 30 and sync pulse 35 (of FIG. 7). The T.V. ask system will enclose a four bit message (1 to F) after corresponding sync pulses 35, 36, 37 and 38.

When the T.V. answer terminal has received the four bits of delay data it will proceed to light the ready led 47, and will store this value in its memory. The T.V. answer terminal will use the delay data to send r-f pulses in response to all instructions (except instructions 1 to 5) before its Assigned Response Line. This delay compensation allows the T.V. ask system to receive r-f pulses from each T.V. answer terminal exactly at the Assigned Response Line for each terminal.

Two or more T.V. stations can have access to T.V. answer terminals, if they time share the r-f frequency. This process is made more efficient if the T.V. ask system of each T.V. station encodes the channel number information on the T.V. signal and if each T.V. answer terminal stores the delay data for each T.V. station.

In operation, the system performs generally in the following way:

A transmitter ask operation sends out queries so organized and synchronized on the video signal that it identifies each receiver answer unit and the distance between receiver and transmitter, measured by the travel time of signals going and returning. Thus, the delay data, plus a local answer unit identification number permits a single r-f beep from any unit to be sent at the proper time so that when received it can be uniquely identified for processing answers to the queries. A computer at the transmitter ask station can identify the address of the respondent, other data, take a poll, or bill for use of special programs.

The receiver response unit is simplified by using the T.V. set i-f radiation so that no tuners or wires are necessary. It processes and times the answering beep in response to variable key set or stored data at a time slot identifying that particular unit. The response transmitter of beeps is low cost and easily licensed at narrow bandwidth, being required simply to produce an r-f non-modulated burst. Thus, all T.V. viewers use the same frequency to transmit answers. This is feasible by time multiplexing the answers in time slots identified by horizontal line counting, and is operable over a large distance because of the system compensation for travel time of the signal. This time delay is automatically evaluated.

The system is operable with cable or r-f transmission. It can handle several answers (for classroom teaching or the like) from one T.V. set.

A more detailed operational description follows for the various key sub-systems.

T.V. ANSWER PROGRAM DESCRIPTION

Reference to FIG. 13 will be helpful to follow the sequence of operationg steps herein discussed.

STEP 1 - Verifies if a proper video signal is being received

The following tests may be made:
a. 525 lines per frame.
b. 63.5 microseconds per line.
c. First vertical blanking internal between line 242.5 and line 263.5 with double sync pulses between line 242.5 and 245.5, signal inversion and double sync pulses between line 245.5 and line 248.5, double sync pulses between line 248.5 and the beginning of line 251, normalization lines and lines reserved for special purposes between line 251 and line 263.5.
d. Second vertical blanking interval between the beginning of line 505 and the end of line 525, with double sync pulses in the first 3 lines, signal inversion and double sync, sync pulses in the next 3 lines, double sync pulses in the next 3 lines, and 12 lines for normalization and reserved for special purposes.

If the received signal conforms to these standards the receiving light emitting diode (LED) will be turned on and the program will proceed to next step. (This routine is designed to distinguish between a live T.V. station transmission and a home VCR reproduction of a previous T.V. station transmission, as video cassette recorders (VCR's) in home use today do not reproduce a standard format during the vertical retrace interval.)

STEP 2 - Verifies if the video signal is encoded with control codes in the first 24 bits of each frame a. An instruction or channel number in bits 17 to 24.
b. A progressive sequence of frame numbers on bits 1 to 16.

The program will remain in this state until it receives a progressive sequence of at least 50 frame numbers, and until it receives the channel number (T.V. ask, will always encode a channel number and a progressive sequence of frame numbers when not encoding an instruction). The program will store the channel number in memory and proceed to the next step.

STEP 3 - The program checks if "delay time" for this channel is stored in memory If "delay time" for channel being received is already in memory it goes to Step 5 (FIG. 13, line 54).
If "delay time" is not in memory it goes to Step 4.

STEP 4 - The program will remain in this step until THE "instruction" in bits 17-24 is equal to the "group number" stored in the PROM (FIG. 12)

When the "instruction" is equal to the "group number", it will wait until the "frame" in bits 1-16 is equal to the "assigned response frame" stored in the PROM 25.

The program will now count "lines" by counting horizontal sync pulses (a special algorithm is provided for counting lines during the vertical retrace interval), when the "line number is equal to the "assigned response line" stored in PROM, the program will trigger an r-f pulse (line 51, FIG. 13) to be sent to the air, the program will then read the "delay data" on the 5th, 6th, 7th and 8th lines after the "assigned response line", and store this in memory as the "delay time" for the particular channel number being received. The program now passes to Step 5.

STEP 5 - The program turns on the "ready" LED, indicating to the user that the equipment is all set for receiving instructions and transmitting answers to those instructions STEP 6 The program reads the "instructions" on bits 17 to 24 of the "control bits", depending on the instruction (6 to 28, FIG. 12). The program executes a routine to perform the function ordered by each instruction. Some of these routines do not transmit an answer pulse to the T.V. station, the ones that do transmit an r-f answer pulse to the T.V. station have to compare the "frame bits" with the "assigned response frame" on PROM, and when equal count lines by counting horizontal sync pulses (with a special routine for counting lines during the vertical retrace internal) until the line number is equal to the "assigned response time" in PROM minus the "delay time" stored in memory for that channel. At this time the program will activate the circuitry for r-f pulse transmission.

Utilizing the multiprogramming capabilities of the microprocessor used by T.V. answer, Steps 1 and 2 are continuously being performed to detect any transmission/reception errors (i.e. an interruption in the progressive sequence of "frame bits" or a change in channel number).

T.V. ASK PROGRAM DESCRIPTION

Reference is made to FIG. 10.
Utilizing the multiprogramming features of the microprocessor, the following routines will be operating simultaneously and continuously:

I. Detecting the frame start from the video signal and inserting the control bits with the following rules.

(a) When there is no question to the T.V. answer, it will be inserting the channel number in the instruction bits and a progressive number in the frame bits (FIG. 9).

(b) When there is a question to the T.V. answer, it will insert, the instruction (FIG. 12) into the instruction bits (FIG. 9), and into the frame bits it will insert a progressive sequential number.

(c) For the adjustment of the delay time, it will insert the instructions 1 to 5 (FIG. 12) and a progressive sequential number into the frame bits of the control bits. It will also insert the data bits that contain the delay time (FIGS. 7 and 8) into the video signal. These data bits are calculated by measuring the time elapsed between the moment in which the horizontal pulse, (that corresponds to a particular T.V. answer) is assigned, and the time at which the answer is received by the T.V. ask.

II. Detecting answers.

After inserting some instructions in the control bits an r-f pulse counting routine will be activated. This routine, besides counting pulses, stores the last 3 T.V. answer frame numbers and response lines of answers received (only 3, due to the size of the microprocessor; with a bigger one, the number could be larger).

III. Receiving information from the computer via serial communication interface 49 (FIG. 10).

(a) Receives the number of the instruction to be sent to the T.V. answer. This instruction will be transmitted to the routines that insert in the video signal and receive the r-f pulse.

(b) Receives a command that asks how many answers were there. This information is obtained from the routines that are activated with questions that require answers.

(c) A command that asks, which were the frame numbers and response lines of the last 3 received answers.

If we analyze the instructions from FIG. 12 we can see that some of them store the answer in memory, thus permitting it to eliminate those answers that were not correct in the last "N" times.

Note: The list of questions in FIG. 12 is only an example of some of the possibilites. Adding more instructions will permit many more applications and or better ways to implement applications.

DETAILED DESCRIPTION OF DELAY TIME MEASUREMENT

Each T.V. answer terminal will answer to questions encoded by the T.V. ask system coded on the T.V. signal by sending r-f pulses. The pulse of each answer terminal should be received by T.V. ask system at a unique time slot. For this purpose each T.V. answer terminal has a unique assigned response line and assigned response frame. The combination of 438 terminals per frame and up to 65536 different frames gives a potential of 28,704,768 unique T.V. answer terminals.

There is a delay time for the signal to travel from the T.V. studio to the T.V. receiver response unit (FIG. 15), and for the answer pulse to travel from T.V. response unit to the T.V. station (FIG. 16).

The delay time depends on the distance between the T.V. station and T.V. receiver location, and it may be different for each terminal. If we want the answer pulse from each T.V. answer unit to be received by the T.V. ask system at the T.V. station at the assigned response line, then the T.V. answer unit should send the answer pulse when the line that it is receiving is equal to the assigned response line minus the delay time.

Each T.V. answer terminal must somehow know the delay time. For this purpose a special dialog is provided between the T.V. ask system and the T.V. answer terminals. On this dialog T.V. ask encodes on the T.V. signal a special instruction (instructions 1 to 5 of FIG. 12) ordering groups of terminals to transmit a pulse as soon as they receive their assigned response line. The T.V. ask system measures the delay time elapsed between the moment in which it transmitted the assigned response line and the moment in which it receives the answer pulse. This elapsed time is the delay time. The T.V. ask system then encodes this delay time as four bits of delay data on the 5th, 6th, 7th and 8th lines after the assigned response line (FIGS. 7, 8, 17). The T.V. answer unit will read the delay data from the T.V. signal and it will store this data in memory. In this way the T.V. answer unit will now know the delay time.

As described on FIG. 18, groups cluster answer terminals with spaced assigned response lines. In this way enough space is provided for the transmission of four bits of delay data without overlapping. However, as there are five groups, the calibration cycle will require five times more time than a normal question cycle.

This invention thus is directed to a bi-direction television system of the type permitting television transmitting stations to ask questions for television receivers to answer, wherein the questions are codified synchronously on the television video signal. Improvements offered by this invention include:

(1) Operation of the system with all responder units using a single r-f burst located on a designated horizontal line uniquely identifying each responder unit, where all units use the same frequency and are identified by a unique predesignated time slot occurring after a single query is made by the transmitted video to all responder units. This feature significantly simplifies both the transmitter and responder systems.

(2) Coupling of the responder unit to the i-f channel of an adjacent T.V. set, thereby to eliminate channel identification means and to permit radiation couplding without wiring.

(3) Compensation of the system for signal transmit time delays greater than one-half a horizontal line distance away (3.75 miles) so that viewers at long distances may be included in the system. This compensation is automatically made.

(4) The system is adaptable to classroom use since several response units with individual identification may be used with a single T.V. set.

Having therefore advanced the state of the art, those features of novelty believed descriptive of the nature and spirit of the invention are defined with particularity in the following claims.

We claim:

1. In a bi-directional television system permitting television stations to ask questions and television signal receivers to answer those questions wherein the questions are codified synchronously on the television video signal, the improvement permitting a large number of receivers to be questioned for response from simplified responders, comprising in combination, means at a transmission site for transmission of a video signal having coded signal queries constituting coded bits superimposed in selected horizontal line video positions and spaced at times permitting responses to be received from receiver responder units in a predetermined geographic area, and responder units at television set locations tuned to said video signal for processing the coded queries and responding thereto to signify an answer with a single r-f burst timed to coincide with a designated horizontal line uniquely identifying each responder unit wherein all units respond with a burst of the same frequency at a unique time slot following each query wherein each responder unit and the transmitted video signal provide identification of the distance (travel time) of the responder unit from the transmission site of the video signal, and the responder units provide a response beep at a time compensating for signal transit time from the transmission site to the responder unit locations and back.

2. The system defined in claim 1 wherein each responder unit processes the video signal from an i-f frequency signal of the television receiver, thereby not requiring channel selection means.

3. The system defined in claim 1 wherein each responder unit derives the i-f frequency signal from the television receiver by radiation.

4. A system as defined in claim 1 wherein one television receiver is coupled to a plurality of responder units.

5. A system as defined in claim 1 further comprising at the transmission site means for processing the signals from all responder units through a single amplifier channel tuned to a single frequency.

6. A system as defined in claim 1 further comprising at the transmission site computer means for analyzing the answer beeps to determine the answers from each individual response unit.

7. A system as defined in claim 1 wherein the transmission site transmits a single query to all response units at the same time.

8. The system defined in claim 1 wherein each responder unit receives video signals from the television receiver by radiation.

* * * * *